United States Patent [19]

Terrell et al.

[11] Patent Number: 5,506,081
[45] Date of Patent: Apr. 9, 1996

[54] PHOTOCONDUCTIVE RECORDING MATERIAL COMPRISING A CROSSLINKED BINDER SYSTEM

[75] Inventors: David Terrell, Lint; Stefaan De Meutter, Antwerp; Marcel Monbaliu, Mortsel, all of Belgium

[73] Assignee: Agfa-Gevaert, N.V., Mortsel, Belgium

[21] Appl. No.: 335,718

[22] PCT Filed: May 21, 1993

[86] PCT No.: PCT/EP93/01284

§ 371 Date: Nov. 10, 1994

§ 102(e) Date: Nov. 10, 1994

[87] PCT Pub. No.: WO93/24863

PCT Pub. Date: Dec. 9, 1993

[30] Foreign Application Priority Data

Jun. 4, 1992 [EP] European Pat. Off. ............ 92201615

[51] Int. Cl.[6] ............................ G03G 5/04; G03G 5/047
[52] U.S. Cl. ................... 430/58; 430/59; 430/96
[58] Field of Search ................... 430/58, 59, 96

[56] References Cited

U.S. PATENT DOCUMENTS 3,226,227  12/1965  Wolff .......................... 430/31
4,490,452  12/1984  Champ et al. .................. 430/58
5,094,930  3/1992  Nomori et al. .................. 430/58

FOREIGN PATENT DOCUMENTS 2473740  1/1981  France .
2952650  7/1980  Germany .
4028519  3/1991  Germany .

Primary Examiner—Roland Martin
Attorney, Agent, or Firm—Breiner & Breiner

[57] ABSTRACT

A photoconductive recording material described containing a support and a charge generating layer (CGL) in contiguous relationship with a charge transporting layer (CTL) containing a p-charge transporting material (p-CTM), wherein the charge generating layer (CGL) does not contain a charge transporting material but comprises a charge generating material and a binder, wherein the binder is made insoluble in methylene chloride by crosslinking and the binder which is composed essentially of one or more polyepoxy compounds self-crosslinked under the influence of an amine catalyst and/or crosslinked by reaction with at least one primary and/or secondary poly NH-group amine.

10 Claims, No Drawings

PHOTOCONDUCTIVE RECORDING MATERIAL COMPRISING A CROSSLINKED BINDER SYSTEM

DESCRIPTION

1. Field of the Invention

The present invention relates to photosensitive recording materials suitable for use in electrophotography.

2. Background of the Invention

In electrophotography photoconductive materials are used to form a latent electrostatic charge image that is developable with finely divided colouring material, called toner.

The developed image can then be permanently affixed to the photoconductive recording material, e.g. a photoconductive zinc oxide-binder layer, or transferred from the photoconductor layer, e.g. a selenium or selenium alloy layer, onto a receptor material, e.g. plain paper and fixed thereon. In electrophotographic copying and printing systems with toner transfer to a receptor material the photoconductive recording material is reusable. In order to permit rapid multiple printing or copying, a photoconductor layer has to be used that rapidly loses its charge on photo-exposure and also rapidly regains its insulating state after the exposure to receive again a sufficiently high electrostatic charge for a next image formation. The failure of a material to return completely to its relatively insulating state prior to succeeding charging/imaging steps is commonly known in the art as "fatigue".

The fatigue phenomenon has been used as a guide in the selection of commercially useful photoconductive materials, since the fatigue of the photoconductive layer limits the copying rates achievable.

A further important property which determines the suitability of a particular photoconductive material for electrophotographic copying is its photosensitivity, which must be sufficiently high for use in copying apparatuses operating with the fairly low intensity light reflected from the original. Commercial usefulness also requires that the photoconductive layer has a spectral sensitivity that matches the spectral intensity distribution of the light source e.g. a laser or a lamp. This enables, in the case of a white light source, all the colours to be reproduced in balance.

Known photoconductive recording materials exist in different configurations with one or more "active" layers coated on a conducting substrate and include optionally an outermost protective layer. By "active" layer is meant a layer that plays a role in the formation of the electrostatic charge image. Such a layer may be the layer responsible for charge carrier generation, charge carrier transport or both. Such layers may have a homogeneous structure or heterogeneous structure.

Examples of active layers in said photoconductive recording material having a homogeneous structure are layers made of vacuum-deposited photoconductive selenium, doped silicon, selenium alloys and homogeneous photoconducting polymer coatings, e.g. of poly(vinylcarbazole) or polymeric binder(s) molecularly doped with an electron (negative charge carrier) transporting compound or a hole (positive charge carrier) transporting compound such as particular hydrazones, amines and heteroaromatic compounds sensitized by a dissolved dye, so that in said layers both charge carrier generation and charge carrier transport take place.

Examples of active layers in said photoconductive recording material having a heterogeneous structure are layers of one or more photosensitive organic or inorganic charge generating pigment particles dispersed in a polymer binder or polymer binder mixture in the presence optionally of (a) molecularly dispersed charge transport compound(s), so that the recording layer may exhibit only charge carrier generation properties or both charge carrier generation and charge transport properties.

According to an embodiment that may offer photoconductive recording materials with particularly low fatigue a charge generating and charge transporting layer are combined in contiguous relationship. Layers which serve only for the charge transport of charge generated in an adjacent charge generating layer are e.g. plasma-deposited inorganic layers, photoconducting polymer layers, e.g. on the basis of poly(N-vinylcarbazole) or layers made of low molecular weight organic compounds molecularly distributed in a polymer binder or binder mixture.

Useful charge carrier generating pigments (CGM's) belong to one of the following classes:
a) perylimides, e.g. C.I. 71130 (C.I.=Colour Index) described in DBP 2 237 539;
b) polynuclear quinones, e.g. anthanthrones such as C.I. 59 300 described in DBP 2 237 678;
c) quinacridones, e.g. C.I. 46 500 described in DBP 2 237 679;
d) naphthalene 1,4,5,8-tetracarboxylic acid derived pigments including the perinones, e.g. Orange GR, C.I. 71 105 described in DBP 2 239 923;
e) tetrabenzoporphyrins and tetranaphthaloporphyrins, e.g. $H_2$-phthalocyanine in X-crystal form (X—$H_2$Pc) described in U.S. Pat. No. 3,357,989, metal phthalocyanines, e.g. CuPc C.I. 74 160 described in DBP 2 239 924, indium phthalocyanine described in U.S. Pat. No. 4,713,312 and tetrabenzoporphyrins described in EP 428,214 A; and naphthalocyanines having siloxy groups bonded to the central metal silicon described in EP 243,205 A;
f) indigo- and thioindigo dyes, e.g. Pigment Red 88, C.I. 73 312 described in DBP 2 237 680;
g) benzothioxanthene derivatives as described e.g. in Deutsches Auslegungsschrift (DAS) 2 355 075;
h) perylene 3,4,9,10-tetracarboxylic acid derived pigments including condensation products with o-diamines as described e.g. in DAS 2 314 051;
i) polyazo-pigments including bisazo-, trisazo- and tetrakisazo-pigments, e.g. Chlordiane Blue C.I. 21 180 described in DAS 2 635 887, trisazo-pigments, e.g. as described in U.S. Pat. No. 4,990,421 and bisazo-pigments as described in Deutsches Offenlegungsschrift (DOS) 2 919 791, DOS 3 026 653 and DOS 3 032 117;
j) squarylium dyes as described e.g. in DAS 2 401 220;
k) polymethine dyes;
l) dyes containing quinazoline groups, e.g. as described in GB-P 1,416,602 according to the following general formula:

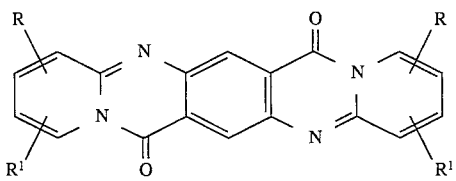

in which R and $R^1$ are either identical or different and denote hydrogen, $C_1$–$C_4$ alkyl, alkoxy, halogen, nitro or hydroxyl or together denote a fused aromatic ring system;
m) triarylmethane dyes; and
n) dyes containing 1,5-diamino-anthraquinone groups, o) inorganic photoconducting pigments e.g. Se, Se alloys, As₂Se₃, TiO₂, ZnO, CdS, etc.

Organic charge carrier transporting substances may be either polymeric or non-polymeric materials.

Examples of preferred polymeric positive hole charge carrier transporting substances are poly(N-vinylcarbazole), N-vinylcarbazole copolymers, polyvinyl anthracene and the condensation products of an aldehyde with two or more 1,2-dihydroquinoline molecules as described in U.S. Pat. No. 5,043,238.

Preferred non-polymeric materials for positive charge transport are:

a) hydrazones e.g. a p-diethylaminobenzaldehyde diphenyl hydrazone as described in U.S. Pat. No. 4,150,987; and other hydrazones described in U.S. Pat. No. 4,423,129; U.S. Pat. No. 4,278,747, U.S. Pat. No. 4,365,014, EP 448,843 A and EP 452,569 A, e.g. T191 from Takasago

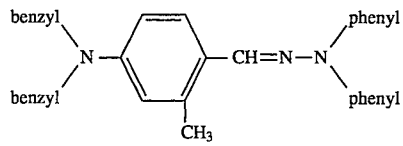

b) aromatic amines e.g. N,N'-diphenyl, N,N-bis-m-tolyl benzidine as described in U.S. Pat. No. 4,265,990, tris(p-tolyl)amine as described in U.S. Pat. No. 3,189,730:

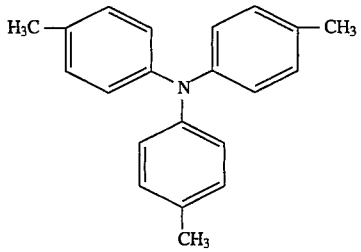

1,3,5-tris(aminophenyl)benzenes as described in U.S. Pat. No. 4,923,774; 3,5-diarylaniline derivatives as described in EP 534,514 A, and triphenyloxazole derivatives as described in EP 534,005 A;

c) heteroaromatic compounds e.g. N-(p-aminophenyl) carbazoles as described in U.S. Pat. No. 3,912,509 and dihydroquinoline compounds as described in U.S. Pat. No. 3,832,171, U.S. Pat. No. 3,830,647, U.S. Pat. No. 4,943,502, U.S. Pat. No. 5,043,238, EP 452,569 A and EP 462,327 A e.g.

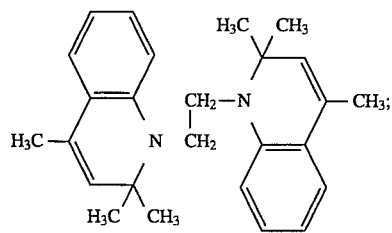

d) triphenylmethane derivatives as described for example in U.S. Pat. No. 4,265,990;

e) pyrazoline derivatives as described for example in U.S. Pat. No. 3,837,851;

f) stilbene derivatives as described for example in Japanese Laid Open Patent Application (JL-OP) 198,043/83.

The choice of binder for the charge generating layer (CGL) for a given charge generating pigment (CGM) and a given charge transport layer (CTL) has a strong influence on the electro-optical properties of the photoreceptors. One or more of the following phenomena can have a negative influence on the electro-optical properties of the photoconductive recording material:

i) interfacial mixing between the CGL and the CTL resulting in CGM-doping of the CTL and CTM-doping of the CGL causing charge trapping;
ii) charge trapping in the CGL;
iii) poor charge transport in the CGL;
iv) poor charge transport blocking properties in the absence of a blocking layer.

Interfacial mixing between the CGL and the CTL can be avoided by using a CGL-binder or binders, which is/are insoluble in the solvent used for dissolving the CTL-binders in which CTM's exhibit optimum charge transport properties. Limited is the range of solvents in which efficient CTM's are soluble. The range of solvents in which both CTL-binders and CTM's are soluble is extremely narrow and often limited to chlorohydrocarbons such as methylene chloride. Methylene chloride is an extremely powerful solvent and the range of CGL-binders which is totally insoluble in methylene chloride is extremely limited, unless the CGL-binder is crosslinked in a subsequent hardening process.

Hardening is to be considered here as a treatment which renders the binder of a charge generating layer of the photoconductive recording material insoluble in methylene chloride.

3. SUMMARY OF THE INVENTION

It is an object of the present invention to provide a multiple layer photo-conductive recording material with improved photosensitivity.

It is still a further object of the present invention to provide a photoconductive recording material wherein interfacial mixing of the charge transporting layer with the charge generating layer is avoided during overcoating of the charge generating layer with a solution of the charge transporting layer composition.

It is still a further object of the present invention to provide a said photoconductive recording material wherein the binder system for the charge generating layer allows efficient charge transport in the charge generating layer and efficient charge injection into the charge transporting layer which is a negative charge transporting layer.

In accordance with the present invention a photoconductive recording material is provided containing a support and a charge generating layer (CGL) in contiguous relationship (contact) with a charge transporting layer (CTL), containing a p-charge transporting material (p-CTM), wherein the binder of said charge generating layer (CGL) is made insoluble in methylene chloride by crosslinking, and said binder is composed essentially of one or more polyepoxy compounds self-crosslinked (by self-condensation) under the influence of an amine catalyst and/or crosslinked by reaction with at least one primary and/or secondary poly NH-group amine.

4. DETAILED DESCRIPTION OF THE INVENTION

The amino groups in said amines can be blocked temporarily to form a stable coating composition wherefrom the amino groups are set free in situ in the coated layer. The blocking of the amino groups may proceed by transforming them into ketimine groups by reaction with a ketone, that is set free again by reaction with moisture (H₂O) [ref. the book "The Chemistry of Organic Film Formers" by D. H. Solomon, John Wiley & Sons, Inc. New York (1967), the chapter "Epoxy Resins", p. 190–191].

The self-condensation of epoxy resins under the action of basic catalysts such as monofunctional amines is described in said book on pages 186–188. Most epoxy resins are difunctional (or nearly so) in terms of epoxy groups, whereby a crosslinked structure forms with primary and/or secondary poly NH-group amines, e.g. ethylene diamine.

According to one embodiment a photoconductive recording material according to the present invention has a charge generating layer containing as the sole binder a crosslinked polymeric structure obtained through self-condensation of polyepoxy compounds in the presence of a catalytic amount of amine or through the reaction of polyepoxy compounds, e.g. epoxy resins, with one or more primary and/or secondary poly NH-group amines.

According to another embodiment a photoconductive recording material according to the present invention has a charge generating layer containing one or more polyepoxy compounds, optionally epoxy resins, self-crosslinked in the presence of one or more catalytically acting amines wherein the concentration of said amines is between 2 and 15% by weight of the total weight of said polyepoxy compounds and amines.

According to a further embodiment a photoconductive recording material according to the present invention has a charge generating layer containing a binder having said polymeric structure derived from one or more polyepoxy compounds crosslinked with one or more of said poly NH-group amines wherein the equivalent ratio of the totality of epoxy groups and NH present in said polyamines is between 2.0:1 and 1:2.0.

According to a still further embodiment a photoconductive recording material according to the present invention has a charge generating layer containing a binder having said polymeric structure and at least 30 wt % of charge generating material(s).

Examples of polyepoxy compounds suitable for use according to the present invention are:

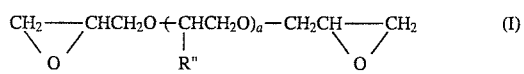

wherein R" is an alkyl group and $a \geq 0$

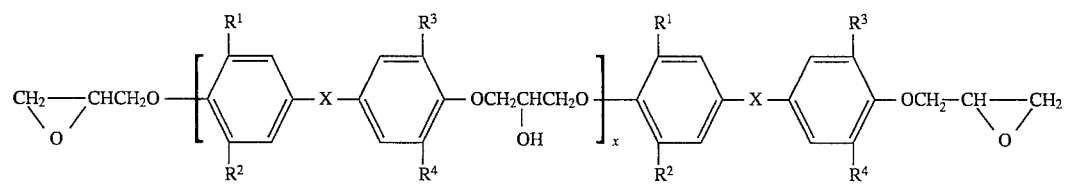

in which: X represents S, SO₂,

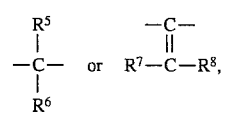

each of $R^1$, $R^2$, $R^3$, $R^4$, $R^7$ and $R^8$ (same or different) represents hydrogen, halogen, an alkyl group or an aryl group; each of $R^5$ and $R^6$ (same or different) represents hydrogen, an alkyl group, an aryl group or together represent the necessary atoms to close a cycloaliphatic ring, e.g. a cyclohexane ring; and x is zero or an integer.

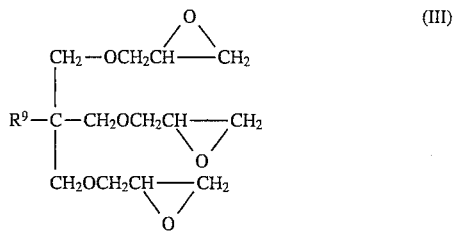

wherein $R^9$ is an alkyl group;

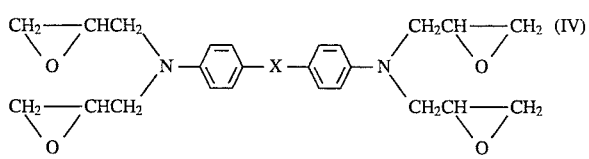

wherein X has the same meaning as above;

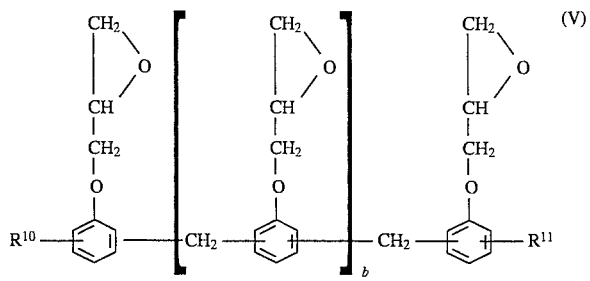

wherein each of $R^{10}$ and $R^{11}$ (same or different) represents hydrogen or an alkyl group and $b \geq 0$.

Commercially available bisphenol A-epichlorhydrin epoxy resins according to formula II are:

EPON 828
EPON 1001
EPON 1002
EPON 1004
EPON 1007
EPON 1009
from Shell Chemical Co.
DER 331
DER 667
DER 668
DER 669
from Dow Chemical; and from Ciba-Geigy Switzerland:
ARALDITE GT 6071
ARALDITE GT 7203
ARALDITE GT 7097
ARALDITE GT 6099

A commercially available mixed bisphenol A/bisphenol F-epichlorhydrin epoxyresin according to formula II is:

EPON 235 from Shell Chemical Co.

A commercially available bisphenol F-epichlorhydrin epoxy resin according to formula II is:

ARALDITE GY 281 from Ciba-Geigy.

A commercially available epoxy resin according to formula IV is:

ARALDITE MY 721 from Ciba-Geigy.

Commercially available phenol novolak epoxy resins according to formula V are:

DEN 431

DEN 438

DEN 439 from Dow Chemical; and from Ciba -Geigy:

ARALDITE GY 1180

ARALDITE EPN 1138

Examples of amines for use according to this invention, which are able to render epoxy resins insoluble in methylene chloride by catalyzing the self-crosslinking of epoxy resins are cyclic aliphatic amines and tertiary amines, e.g.

piperidine 2,5-dimethylpiperazine triethylamine benzyldimethylamine (BDA)

2-dimethylaminomethylphenol (DMAMP)

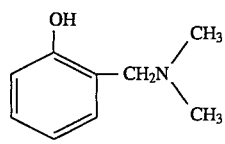

2,4,6-tris(dimethylaminomethyl)phenol (TDMAMP)

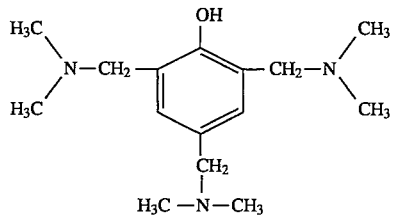

Examples of poly NH-group amines for use according to this invention, which are able to render epoxy resins insoluble in methylene chloride are:

i) aromatic poly NH-group amines or derivatives thereof e.g.

4,4'-diaminodiphenylmethane (DDM)-derivatives commercially available as EPICURE 153 from Shell Chemical and ARALDITE HY 830 from Ciba-Geigy;

4,4' -diaminodiphenylsulphone;

1,3,5-tris(4'-aminophenyl)benzene meta-phenylenediamine

  AP1

3,5-diphenylaniline

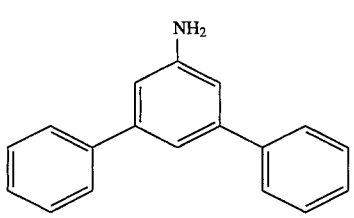  AP2

3,5-di(2-thiophenyl)aniline

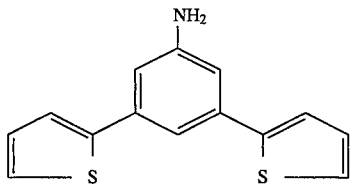  AP3

5-(4-aminophenyl)-2,4-bis(4-methoxyphenyl)-oxazole

-continued

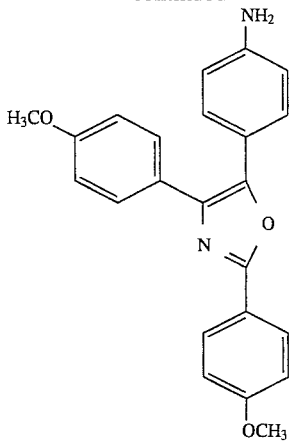

N-(4-aminophenyl)carbazole

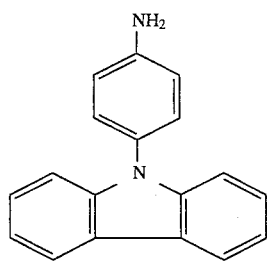

meta-phenylene diamine ii) poly NH-group amines wherein aliphatic amino groups are attached to an aromatic backbone e.g.:

meta-xylylene diamine commercially available as EPILINK MX from Akzo, The Netherlands;

3-phenyl-2-propylamine iii) cycloaliphatic poly NH-group amines e.g. isophorondiamine derivatives commercially available as EPILINK 420 from Akzo, The Netherlands;

iv) heterocyclic poly NH-group amines e.g.

4-aminomethylpiperidine

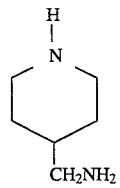

4-amino-2,2,6,6-tetramethylpiperidine

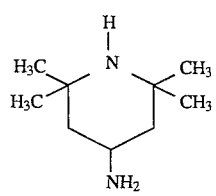

The hardened polymeric binder structure obtained by self-condensation of polyepoxy compounds in the presence of catalytic amounts of amines or obtained by crosslinking reaction of polyepoxy compounds with primary and/or secondary poly NH-group amines may be used in combination with at least one other polymer serving as binding agent, e.g. in combination with acrylate and methacrylate resins, copolyesters of a diol, e.g. glycol, with isophthalic and/or terephthalic acid, polyacetals, polyurethanes, polyester-urethanes, aromatic polycarbonates, wherein a preferred combination contains at least 50% by weight of said hardened polymeric structure in the total binder content.

A polyester resin particularly suited for used in combination with said hardened resins is DYNAPOL L 206 (registered trade mark of Dynamit Nobel for a copolyester of terephthalic acid and isophthalic acid with ethylene glycol and neopentyl glycol, the molar ratio of tere- to isophthalic acid being 3/2). Said polyester resin improves the adherence to aluminium that may form a conductive coating on the support of the recording material.

Aromatic polycarbonates that are suitable for use in admixture with said polyepoxy compounds hardened with said amines can be prepared by methods such as those described by D. Freitag, U. Grigo, P. R. Müller and W. Nouverné in the Encyclopedia of Polymer Science and Engineering, 2nd ed., Vol. II, pages 648–718, (1988) published by Wiley and Sons Inc., and have one or more repeating units within the scope of following general formula:

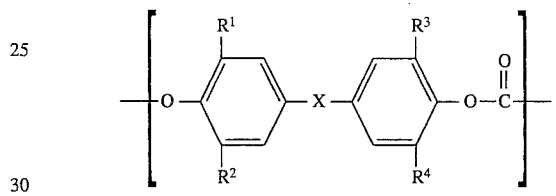

wherein: X, $R^1$, $R^2$, $R^3$ and $R^4$ have the same meaning as described in general formula (II) above.

Aromatic polycarbonates having a molecular weight in the range of 10,000 to 200,000 are preferred. Suitable polycarbonates having such a high molecular weight are sold under the registered trade mark MAKROLON of Bayer AG, W-Germany.

MAKROLON CD 2000 (registered trademark) is a bisphenol A polycarbonate with molecular weight in the range of 12,000 to 25,000 wherein $R^1=R^2=R^3=R^4=H$, X is

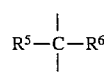

with $R^5=R^6=CH_3$.

MAKROLON 5700 (registered trade mark) is a bisphenol A polycarbonate with molecular weight in the range of 50,000 to 120,000 wherein $R^1=R^2=R^3=R^4=H$, X is

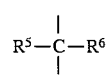

with $R^5=R^6=CH_3$.

Bisphenol Z polycarbonate is an aromatic polycarbonate containing recurring units wherein $R^1=R^2=R^3=R^4=H$, X is

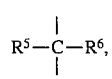

and $R^5$ together with $R^6$ represents the necessary atoms to close a cyclohexane ring.

Suitable electronically inactive binder resins for use in active layers of the present photoconductive recording material not containing said polyepoxy compounds hardened with said amines are e.g. the above mentioned polyester and polycarbonates, but also cellulose esters, acrylate and methacrylate resins, e.g. cyanoacrylate resins, polyvinyl chloride, copolymers of vinyl chloride, e.g. copolyvinyl chloride/ acetate and copolyvinyl chloride/maleic anhydride.

Further useful binder resins for an active layer are silicone resins, polystyrene and copolymers of styrene and maleic anhydride and copolymers of butadiene and styrene.

Charge transport layers in the photoconductors of the present invention preferably have a thickness in the range of 5 to 50 μm, more preferably in range of 5 to 30 μm. If these layers contain low molecular weight charge transport molecules, such compounds will preferably be present in concentrations of 30 to 70% by weight.

The presence of one or more spectral sensitizing agents can have an advantageous effect on the charge transport. In that connection reference is made to the methine dyes and xanthene dyes described in U.S. Pat. No. 3,832,171. Preferably these dyes are used in an amount not substantially reducing the transparency in the visible light region (420–750 nm) of the charge transporting layer so that the charge generating layer still can receive a substantial amount of the exposure light when exposed through the charge transporting layer.

The charge transporting layer may contain compounds substituted with electron-acceptor groups forming an intermolecular charge transfer complex, i.e. donor-acceptor complex when electron donor charge transport compounds are present. Useful compounds having electron-accepting groups are nitrocellulose and aromatic nitro-compounds such as nitrated fluorenone-9 derivatives, nitrated 9-dicyanomethylene fluorenone derivatives, nitrated naphthalenes and nitrated naphthalic acid anhydrides or imide derivatives. The preferred concentration range of said compounds having electron acceptor groups is such that the donor/acceptor weight ratio is 2.5:1 to 1,000:1.

Compounds acting as stabilising agents against deterioration by ultra-violet radiation, so-called UV-stabilizers, may also be incorporated in said charge transport layer. Examples of UV-stabilizers are benztriazoles.

For controlling the viscosity and aiding deaeration of the coating compositions and controlling their optical clarity silicone oils may be added to the charge transport layer.

As charge generating compounds for use in a recording material according to the present invention any of the organic pigments belonging to one of the following classes and able to transfer electrons to electron transporting materials may be used:

a) perylimides, e.g. C.I. 71 130 (C.I.=Colour Index) described in DBP 2 237 539,
b) polynuclear quinones, e.g. anthanthrones such as C.I. 59 300 described in DBP 2 237 678,
c) quinacridones, e.g. C.I. 46 500 described in DBP 2 237 679,
d) naphthalene 1,4,5,8-tetracarboxylic acid derived pigments including the perinones, e.g. Orange GR, C.I. 71 105 described in DBP 2 239 923,
e) tetrabenzoporphyrins and tetranaphthaloporphyrins, e.g. $H_2$-phthalocyanine in X-crystal form (X—$H_2$Pc) described in U.S. Pat. No. 3,357,989, metal phthalocyanines, e.g. CuPc C.I. 74 160 described in DBP 2 239 924, indium phthalocyanine described in U.S. Pat. No. 4,713, 312, tetrabenzoporphyrins described in EP 428 214 A, silicon naphthalocyanines having siloxy groups bonded to the central silicon as described in EP-A 0243 205 and X- and β-morphology $H_2Pc(CN)_x$, $H_2Pc(CH_3)_x$ and $H_2PcCl_x$ pigments.

f) indigo- and thioindigo dyes, e.g. Pigment Red 88, C.I. 73 312 described in DBP 2 237 680,
g) benzothioxanthene-derivatives as described e.g. in DAS 2 355 075,
h) perylene 3,4,9,10-tetracarboxylic acid derived pigments including condensation products with o-diamines as described e.g. in DAS 2 314 051,
i) polyazo-pigments including bisazo-, trisazo- and tetrakisazo-pigments, e.g. Chlordiane Blue C.I. 21 180 described in DAS 2 635 887, and bisazopigments described in DOS 2 919 791, DOS 3 026 653 and DOS 3 032 117,
j) squarilium dyes as described e.g. in DAS 2 401 220,
k) polymethine dyes.
l) dyes containing quinazoline groups, e.g. as described in GB-P 1 416 602 according to the following general formula:

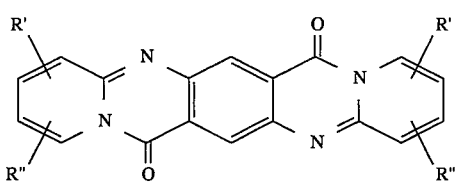

wherein R' and R" have the meaning described in said GB-P document.

Inorganic substances suited for photogenerating negative charges in a recording material according to the present invention are e.g. amorphous selenium and selenium alloys e.g. selenium-tellurium, selenium-tellurium-arsenic and selenium-arsenic and inorganic photoconductive crystalline compounds such as cadmium sulphoselenide, cadmiumselenide, cadmium sulphide and mixtures thereof as disclosed in U.S. Pat. No. 4,140,529.

The thickness of the charge generating layer is preferably not more than 10 μm, more preferably not more than 5 μm.

In the recording materials of the present invention an adhesive layer or barrier layer may be present between the charge generating layer and the support or the charge transport layer and the support. Useful for that purpose are e.g. a polyamide layer, nitrocellulose layer, hydrolysed silane layer, or aluminium oxide layer acting as blocking layer preventing positive or negative charge injection from the support side. The thickness of said barrier layer is preferably not more than 1 micron.

The conductive support may be made of any suitable conductive material. Typical conductors include aluminum, steel, brass and paper and resin materials incorporating or coated with conductivity enhancing substances, e.g. vacuum-deposited metal, dispersed carbon black, graphite and conductive monomeric salts or a conductive polymer, e.g. a polymer containing quaternized nitrogen atoms as in Calgon Conductive polymer 261 (trade mark of Calgon Corporation, Inc., Pittsburgh, Pa., U.S.A.) described in U.S. Pat. No. 3,832,171.

According to a particular embodiment the support is an insulating resin support provided with an aluminium layer forming a conducting coating.

The support may be in the form of a foil, web or be part of a drum.

An electrophotographic recording process according to the present invention comprises the steps of:
(1) overall electrostatically charging, e.g. with coronadevice, the photoconductive layer containing at least one polyepoxy compound hardened with at least one of said amines;

(2) image-wise photo-exposing said layer thereby obtaining a latent electrostatic image, that may be toner-developed.

When applying a bilayer-system electrophotographic recording material including on an electrically conductive support a photosensitive charge generating layer that contains one or more polyepoxy compounds hardened with one or more of said amines in contiguous relationship with a charge transporting layer, the photo-exposure of the charge generating layer proceeds preferably through the charge transporting layer but may be direct if the charge generating layer is uppermost or may proceed likewise through the conductive support if the latter is transparent enough to the exposure light.

The development of the latent electrostatic image commonly occurs preferably with finely divided electrostatically attractable material, called toner particles that are attracted by coulomb force to the electrostatic charge pattern. The toner development is a dry or liquid toner development known to those skilled in the art.

In positive-positive development toner particles deposit on those areas of the charge carrying surface which are in positive-positive relation to the original image. In reversal development, toner particles migrate and deposit on the recording surface areas which are in negative-positive image value relation to the original. In the latter case the areas discharged by photo-exposure obtain by induction through a properly biased developing electrode a charge of opposite charge sign with respect to the charge sign of the toner particles so that the toner becomes deposited in the photo-exposed areas that were discharged in the imagewise exposure (ref.: R. M. Schaffert "Electrophotography"—The Focal Press—London, N.Y., enlarged and revised edition 1975, p. 50–51 and T. P. Maclean "Electronic Imaging" Academic Press—London, 1979, p. 231).

According to a particular embodiment electrostatic charging, e.g. by corona, and the imagewise photo-exposure proceed simultaneously.

Residual charge after toner development may be dissipated before starting a next copying cycle by overall exposure and/or alternating current corona treatment.

Recording materials according to the present invention depending on the spectral sensitivity of the charge generating layer may be used in combination with all kinds of photon-radiation, e.g. light of the visible spectrum, infra-red light, near ultra-violet light and likewise X-rays when electron-positive hole pairs can be formed by said radiation in the charge generating layer. Thus, they can be used in combination with incandescent lamps, fluorescent lamps, laser light sources or light emitting diodes by proper choice of the spectral sensitivity of the charge generating substance or mixtures thereof.

The toner image obtained may be fixed onto the recording material or may be transferred to a receptor material to form thereon after fixing the final visible image.

A recording material according to the present invention showing a particularly low fatigue effect can be used in recording apparatus operating with rapidly following copying cycles including the sequential steps of overall charging, imagewise exposing, toner development and toner transfer to a receptor element.

The following examples further illustrate the present invention. All parts, ratios and percentages are by weight unless otherwise stated.

The evaluations of electrophotographic properties determined on the recording materials of the following examples relate to the performance of the recording materials in an electrophotographic process with a reusable photoreceptor. The measurements of the performance characteristics were carried out by using a sensitometric measurement in which the discharge was obtained for 16 different exposures in addition to zero exposure. The photoconductive recording sheet material was mounted with its conductive backing on an aluminium drum which was earthed and rotated at a circumferential speed of 10 cm/s. The recording material was sequentially charged with a positive corona at a voltage of −5.7 kV operating with a grid voltage of −600 V. Subsequently the recording material was exposed (simulating image-wise exposure) with a light dose of monochromatic light obtained from a monochromator positioned at the circumference of the drum at an angle of 45° with respect to the corona source. The photo-exposure lasted 200 ms. Thereupon, the exposed recording material passed an electrometer probe positioned at an angle of 180° with respect to the corona source. After effecting an overall post-exposure with a halogen lamp producing 355 mJ/m2 positioned at an angle of 270° with respect to the corona source a new copying cycle started. Each measurement relates to 80 copying cycles in which the photoconductor is exposed to the full light source intensity for the first 5 cycles, then sequentially to the light source the light output of which is moderated by grey filters of optical densities 0.2, 0.38, 0.55, 0.73, 0.92, 1.02, 1.20, 1.45, 1.56, 1.70, 1.95, 2.16, 2.25, 2.51 and 3.21, each for 5 cycles and finally to zero light intensity for the last 5 cycles.

The electro-optical results quoted in the EXAMPLES 1 to 20 hereinafter refer to charging level at zero light intensity (CL) and to discharge at a light intensity corresponding to the light source intensity moderated by a grey filter to the exposure indicated to a residual potential RP.

The % discharge is:

$$\frac{(CL-RP)}{CL} \times 100$$

For a given corona voltage, corona current, separating distance of the corona wires to recording surface and drum circumferential speed the charging level CL is only dependent upon the thickness of the charge transport layer and its specific resistivity. In practice CL expressed in volts should be preferably $\geq 30$ d, where d is the thickness in μm of the charge transport layer.

The structures of the CTM's used in the examples (P1 to P6) are given below:

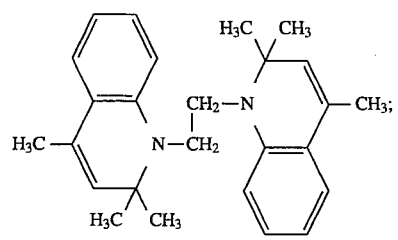 (P1)
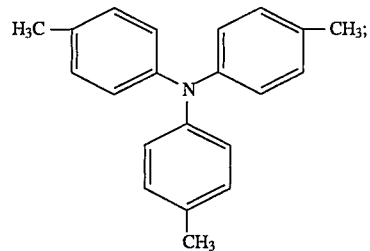 (P2)
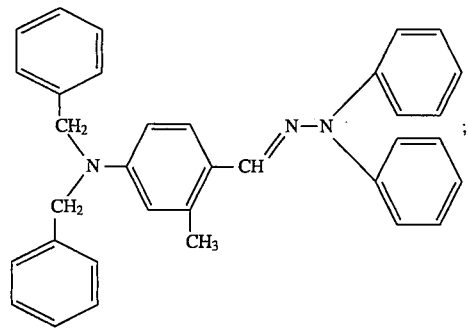 (P3)
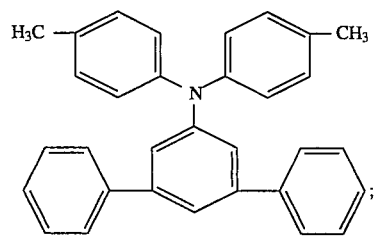 (P4)
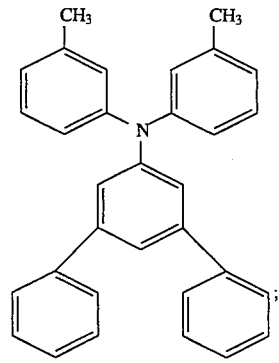 (P5)

-continued

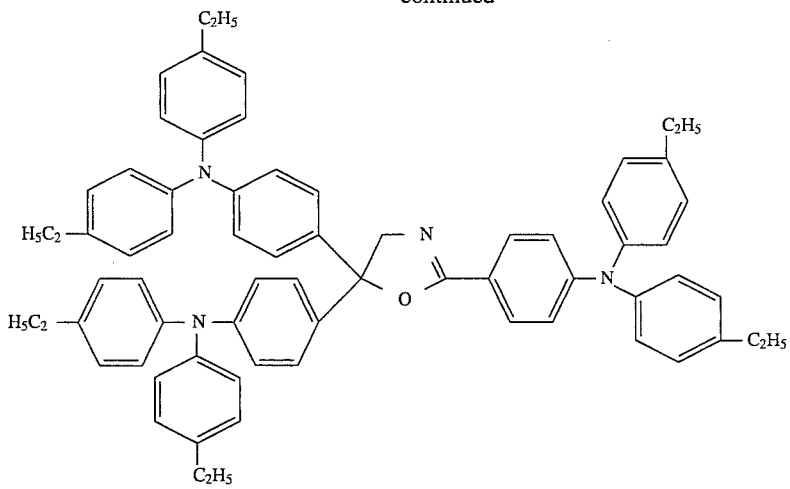

(P6)

All ratios and percentages mentioned in the Examples are by weight.

EXAMPLE 1

In the production of a composite layer electrophotographic recording material a 175 μm thick polyester film pre-coated with a vacuum-deposited layer of aluminium was doctor-blade coated with a dispersion of charge generating pigment to a thickness of 0.9 μm.

Said dispersion was prepared by mixing for 40 hours in a ball mill 2 g of metal free X-phthalocyanine (FASTOGEN BLUE 8120B from Dainippon Ink and Chemicals Inc.); 0.27 g of ARALDITE GT7203 (tradename for a bisphenol A-epichlorhydrin epoxy resin from Ciba-Geigy); 9.66 g of butan-2-one and 16.44 g of methylene chloride. 1.56 g of ARALDITE T7203 (tradename), 5.3 g of butan-2-one, 8.952 g of methylene chloride and 0.168 g of 2.5 dimethylpiperazine (a catalytically active heterocyclic amine) were then added to the dispersion and the dispersion mixed for a further 15 minutes.

The applied layer was dried and thermally hardened for 18 hours at 150° C. and then overcoated using a doctor-blade coater with a filtered solution consisting of 3 g of the CTM P1; 3 g of MAKROLON 5700 (tradename for a bisphenol A polycarbonate from Bayer A.G).; and 44 g of methylene chloride to a thickness in dry state of 12.1 μm. Drying proceeded at 50° C. for 16 hours.

The electro-optical characteristics of the thus obtained photoconductive recording materials were determined as described above. At a charging level of −547 V and an exposure dose of 660 nm light ($I_{660}t$) of 10 mJ/m², the following results were obtained:

| CL = | −547 V |
|---|---|
| RP = | −110 V |
| % Discharge = | 79.9 |

EXAMPLES 2 AND 3

The photoconductive recording materials of examples 2 and 3 were produced as described for example 1 except that alternative catalytically active amines were used in the materials of examples 2 and 3 and hardening conditions of 12 hours at 150° C. and 1 hour at 100° C. were used respectively. The weight percentages of the ARALDITE GT7203 (tradename) and catalytically active amine in the CGL's calculated on the basis of the solids content of the hardener are given in Table 1 together with the CTL layer thicknesses ($d_{CTL}$).

The electro-optical characteristics of the thus obtained photoconductive recording materials were determined as described above and the results summarized in Table 1 together with these for the photoconductive recording material of example 1.

TABLE 1

| | ARALDITE GT7203 | | Hardener | | $I_{660}t = 10$ mJ/m² | | |
|---|---|---|---|---|---|---|---|
| Example No. | conc. [wt %] | Catalytically active amine | conc. [wt %] | $d_{CTL}$ [μm] | CL [V] | RP [V] | % Discharge |
| 1 | 45.8 | 2,5-dimethyl-piperazine | 4.2 | 12.1 | −547 | −110 | 79.9 |
| 2 | 47 | piperidine | 3 | 14.1 | −538 | −150 | 72.1 |
| 3 | 47 | 2,4,6-tris(dimethylamino-methyl)-phenol | 3 | 15.1 | −621 | −232 | 62.6 |

EXAMPLES 4 TO 12

The photoconductive recording materials of examples 4 to 12 were produced as described for example 1 except that different aromatic poly NH-group amine hardeners and different hardening conditions were used as indicated in Table 2. The amounts of ARALDITE GT7203 (tradename) and hardener were adjusted to obtain a theoretical degree of hardening of 100%. The weight percentages of the ARALDITE GT7203 (tradename) and hardener in the CGL's calculated on the basis of the solids content of the hardener are given in Table 2 together with the CTL layer thicknesses ($d_{CTL}$).

The electro-optical characteristics of the thus obtained photoconductive recording materials were determined as described above and the results summarized in Table 2.

groups are attached to an aromatic backbone were used as hardeners instead of 2,5-dimethylpiperazine and they were hardened as indicated in Table 4. The amounts of ARALDITE GT7203 (tradename) and poly NH-group amine were adjusted to obtain a theoretical degree of hardening of 100%. The weight percentages of ARALDITE GT7203 (tradename) and poly NH-group amine calculated on the basis of the solids content of the reactants are given

TABLE 2

| Example no. | ARALDITE GT 7203 conc. [wt %] | Hardener | Hardener conc. [wt %] | Hardening condit. Temp. (°C.) | Hardening condit. Time (hrs) | $I_{660}t = 10$ mJ/m$^2$ $d_{CTL}$ [µm] | $I_{660}t = 10$ mJ/m$^2$ CL [V] | $I_{660}t = 10$ mJ/m$^2$ RP [V] | $I_{660}t = 10$ mJ/m$^2$ % discharge |
|---|---|---|---|---|---|---|---|---|---|
| 4 | 46.3 | 4,4'-diamino-diphenyl-methane | 3.7 | 100 | 2 | 10.1 | −550 | −128 | 76.7 |
| 5 | 42.23 | ARALDITE HY830* | 7.77 | 100 | 2 | 12.1 | −543 | −124 | 77.2 |
| 6 | 45.48 | 4,4'-diamino-diphenyl-sulfone | 4.52 | 100 | 24 | 13.1 | −540 | −113 | 79.1 |
| 7 | 45.71 | AP1 | 4.29 | 100 | 2 | 10.1 | −519 | −112 | 78.4 |
| 8 | 41.8 | AP2 | 8.2 | 100 | 2 | 12.1 | −570 | −122 | 78.6 |
| 9 | 41.46 | AP3 | 8.54 | 100 | 2 | 11.1 | −567 | −120 | 78.8 |
| 10 | 38.52 | AP4 | 11.48 | 100 | 2 | 12.1 | −586 | −157 | 73.2 |
| 11 | 41.43 | AP5 | 8.57 | 100 | 2 | 15.1 | −551 | −101 | 81.7 |
| 12 | 47.92 | meta-phenylene-diamine | 2.08 | 150 | 18 | 14.1 | −561 | −121 | 78.4 |

*tradename of Ciba-Geigy.

EXAMPLES 13 AND 14

The photoconductive recording materials of examples 13 and 14 were produced as described for example 7 except that different epoxy resins were used (as indicated in Table 3) instead of ARALDITE GT7203 (tradename). The amounts of epoxy resin and hardener were adjusted to obtain a theoretical degree of hardening of 100%. The weight percentages of the epoxy resin and hardener in the CGL's calculated on the basis of the solids content of the hardener are given in Table 3 together with the CTL layer thicknesses ($d_{CTL}$).

The electro-optical characteristics of the thus obtained photoconductive recording materials were determined as described above and the results are summarized in Table 3 together with those for the photoconductive recording material of example 7.

in Table 4 together with the CTL layer thicknesses.

The electro-optical characteristics of the thus obtained photoconductive recording materials were determined as described above and the results are summarized in Table 4.

TABLE 3

| Example no. | Epoxy resin (trade name) | Epoxy resin conc. [wt %] | AP1 conc. [wt %] | $I_{660}t = 10$ mJ/m$^2$ $d_{CTL}$ [µm] | $I_{660}t = 10$ mJ/m$^2$ CL [V] | $I_{660}t = 10$ mJ/m$^2$ RP [V] | $I_{660}t = 10$ mJ/m$^2$ % discharge |
|---|---|---|---|---|---|---|---|
| 7 | ARALDITE GT7203 | 45.71 | 4.29 | 10.1 | −519 | −112 | 78.4 |
| 13 | ARALDITE GY281 | 36.9 | 13.1 | 13.1 | −576 | −152 | 73.6 |
| 14 | DEN 438 | 37.64 | 12.36 | 14.1 | −559 | −120 | 78.5 |

EXAMPLES 15 AND 16

The photoconductive recording materials of examples 15 and 16 were produced as described for example 1 except that different poly NH-group amines wherein aliphatic amino

TABLE 4

| Exam-ple no. | ARALDITE GT 7203 conc. [wt %] | Hardener | Hardener conc. [wt %] | Hardening conditions Temp. (°C.) | Time (hrs) | $I_{660}t = 10$ mJ/m² $d_{CTL}$ [μm] | CL [V] | RP [V] | % discharge |
|---|---|---|---|---|---|---|---|---|---|
| 15 | 47.07 | EPILINK MX* | 2.93 | 150 | 16 | 13.1 | −541 | −112 | 79.3 |
| 16 | 45.1 | 3-phenyl-2-propylamine | 4.9 | 150 | 18 | 14.1 | −561 | −98 | 82.5 |

*tradename of Akzo, The Netherlands.

EXAMPLES 17 AND 18

The photoconductive recording materials of examples 17 and 18 were produced as described for example 1 except that cycloaliphatic poly NH-group amines were used as hardeners and hardening took place under the conditions indicated in Table 5. The amounts of ARALDITE GT7203 (tradename) and poly NH-group amine were adjusted to obtain a theoretical degree of hardening of 100%. The weight percentages of the ARALDITE GT7203 (tradename) and poly NH-group amine in the CGL's calculated on the basis of the solids content of the reactants are given in Table 5 together with the CTL layer thicknesses ($d_{CTL}$).

The electro-optical characteristics of the thus obtained photoconductive recording materials were determined as described above and the results are summarized in Table 5.

TABLE 5

| Exam-ple no. | ARALDITE GT 7203 conc. [wt %] | Poly NH-group amine hardener | Hardener conc. [wt %] | Hardening condit. Temp. (°C.) | Time (hrs) | $I_{660}t = 10$ mJ/m² $d_{CTL}$ [μm] | CL [V] | RP [V] | % discharge |
|---|---|---|---|---|---|---|---|---|---|
| 17 | 40.04 | EPILINK 420* | 9.96 | 150 | 16 | 7.1 | −411 | −87 | 78.8 |
| 18 | 46.81 | Isophoron-diamine | 3.19 | 100 | 2 | 13.1 | −589 | −151 | 73.9 |

*trademark of Akzo, The Netherlands.

EXAMPLES 19 AND 20

The photoconductive recording materials of examples 19 and 20 were produced as described in example 1 except that heterocyclic poly NH-group amines were used as hardeners instead of 2,5-dimethylpiperazine and hardening took place under the conditions indicated in Table 6. The amounts of ARALDITE GT7203 (tradename) and poly NH-group amine were adjusted to obtain a theoretical degree of hardening at 100%. The weight percentages of ARALDITE GT7203 (tradename) and poly NH-group amine calculated on the basis of the solids contents of the reactants are given in Table 6 together with the CTL layer thicknesses ($d_{CTL}$).

The electro-optical properties of the thus obtained photoconductive recording materials were determined as described above and the results are summarized in Table 6.

TABLE 6

| Exam-ple no. | ARALDITE GT 7203 conc. [wt %] | Poly NH-group amine hardener | Hardener conc. [wt %] | Hardening condit. Temp. (°C.) | Time (hrs) | $I_{660}t = 10$ mJ/m² $d_{CTL}$ [μm] | CL [V] | RP [V] | % discharge |
|---|---|---|---|---|---|---|---|---|---|
| 19 | 47.2 | 4-aminomethyl-piperidine | 2.8 | 2 | 100 | 12.1 | −567 | −178 | 68.6 |
| 20 | 46.15 | 4-amino-2,2,6,6-tetramethyl-piperidine | 3.85 | 2 | 100 | 14.1 | −592 | −164 | 72.3 |

We claim:

1. A photoconductive recording material containing a support and a charge generating layer (CGL) in contiguous 1. relationship with a charge transporting layer (CTL) containing a p-charge transporting material (p-CTM), said charge generating layer (CGL) not containing a charge transporting material and comprising a charge generating material and a binder, wherein said binder is made insoluble in methylene chloride by crosslinking and said binder is composed essentially of one or more polyepoxy compounds self-crosslinked under the influence of an amine catalyst and/or crosslinked by reaction with at least one primary and/or secondary poly NH-group amine.

2. Photoconductive recording material according to claim 1, wherein said charge generating layer (CGL) contains as the sole binder a crosslinked polymeric structure obtained through self-condensation of polyepoxy compounds in the presence of a catalytic amount of amine or through the reaction of polyepoxy compounds with one or more primary and/or secondary poly NH-group amines.

3. Photoconductive recording material according to claim 1, wherein said charge generating layer contains one or more polyepoxy compounds self-crosslinked in the presence of one or more catalytically acting amines wherein the concentration of said amines is between 2 and 15% by weight of the total weight of said polyepoxy compounds and amines.

4. Photoconductive recording material according to claim 1, wherein said charge generating layer contains a binder having said polymeric structure derived from one or more polyepoxy compounds crosslinked with one or more of said polyamines wherein the equivalent ratio of the totality of epoxy groups and NH present in said poly NH-group amines is between 2.0:1 and 1:2.0.

5. Photoconductive recording material according to claim 1, wherein said polyepoxy compounds serving as crosslinking agents are within the scope of at least one of the following formulae (I), (II), (III), (IV) and (V):

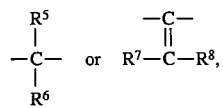   (I)

wherein R" is an alkyl group and $a \geq 0$

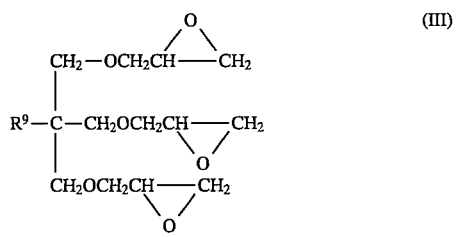   (II)

in which: X represents one of S, SO$_2$,

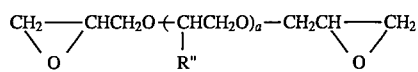

each of R$^1$, R$^2$, R$^3$, R$^4$, R$^7$ and R$^8$ (same or different) represents one of hydrogen, halogen, an alkyl group or an aryl group; each of R$^5$ and R$^6$ (same or different) represents hydrogen, an alkyl group, an aryl group or together represent one of the necessary atoms to close a cycloaliphatic ring, and x is zero or an integer

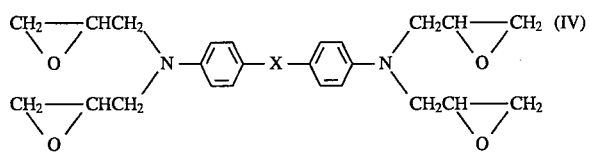   (III)

wherein R$^9$ is an alkyl group;

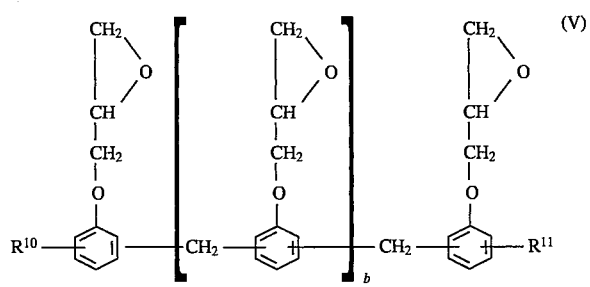   (IV)

wherein X has the same meaning as above;

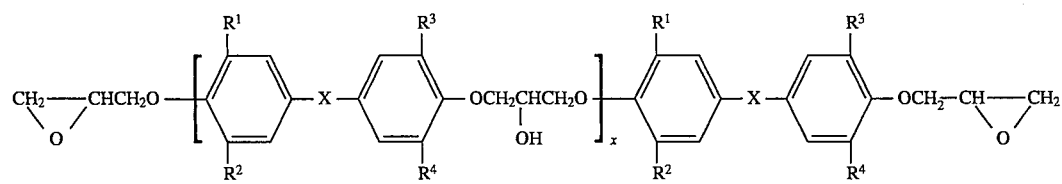   (V)

wherein each of R$^{10}$ and R$^{11}$ (same or different) represents hydrogen or an alkyl group and $b \geq 0$.

6. Photoconductive recording material according to claim 1, wherein the amino groups in said amines have been blocked temporarily to form a stable coating composition wherefrom the amino groups are set free in situ in the coated layer.

7. Photoconductive recording material according to claim 1, wherein said polymeric reaction products obtained by crosslinking said polyepoxy compounds with said amines are used in combination with at least one other polymer serving as binding agent.

8. Photoconductive recording material according to claim 7, wherein said other polymer is selected from the group consisting of an acrylate resin, methacrylate resin, copolyester of a diol with isophthalic and/or terephthalic acid, polyacetal, polyurethane, polyester-urethane and aromatic polycarbonate.

9. Photoconductive recording material according to claim 7, wherein said other polymer is present in said combination in an amount less than 50% by weight of the total binder content.

10. Photoconductive recording material according to claim 1, wherein said support consists of aluminium or is a support provided with an aluminium layer forming a conductive coating.

* * * * *